Oct. 16, 1934.　　P. L. O'DONNELL ET AL　　1,977,488
CUT-OFF MECHANISM FOR TAPING MACHINES
Filed Oct. 27, 1931　　2 Sheets-Sheet 1

Inventors
Philip L. O'Donnell
Edward Groh
By Murray W. Zugelter
Attorneys

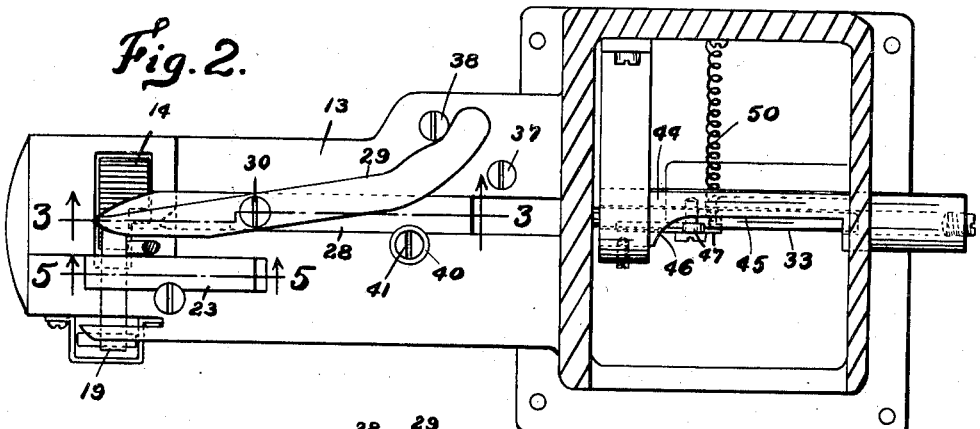
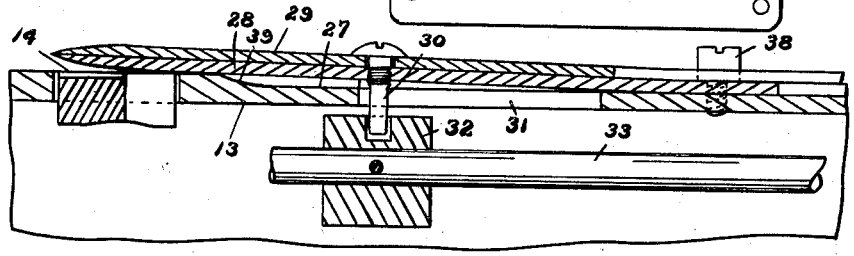
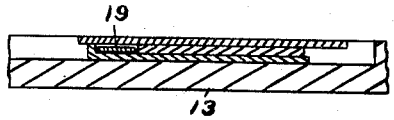
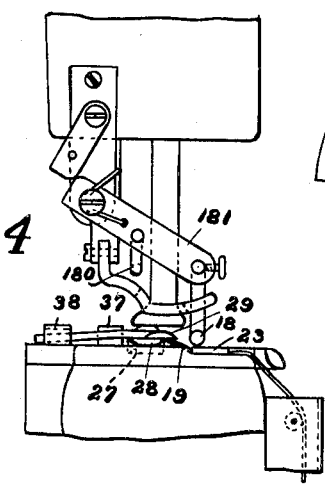
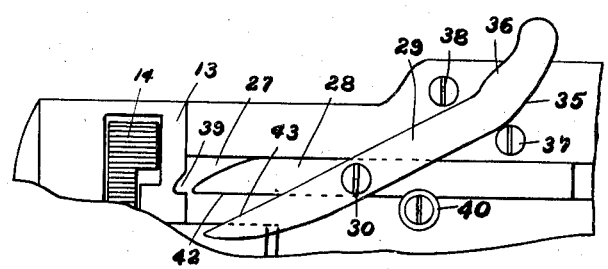

Patented Oct. 16, 1934

1,977,488

UNITED STATES PATENT OFFICE 1,977,488

CUT-OFF MECHANISM FOR TAPING MACHINES

Philip L. O'Donnell, Norwood, and Edward Groh, Cincinnati, Ohio

Application October 27, 1931, Serial No. 571,426

8 Claims. (Cl. 154—42)

The present invention relates to improvements in taping machines and has for its primary object the provision of a shear or scissor mechanism embodied in a taping machine of approved design and which is under the control of the operator to be normally disposed entirely clear of the field of operation of the tape applying mechanism but, upon operation of a lever or treadle to raise the presser foot and walking foot of the machine and introduce the shears in an open position beneath the work to receive the tape and to sever the tape close to the work and in such manner as to leave a free end for application to other work and to then retire the shear or scissor and leave the presser and walking foot raised for introduction and positioning of the new piece of work.

Another object is to provide a mechanism of the type described which automatically halts the feed of the work and tape through the machine when the operator initiates the treadle movement to operate the cut-off.

Another object is to provide a mechanism which automatically performs its functions and leaves the machine in position for receiving an additional piece of work to be taped.

These and other objects are attained by the means described herein and disclosed in the accompanying drawings, in which:

Fig. 2 is a view taken on line 2—2 of Fig. 1 and showing the shear or scissor in the cutting position.

Fig. 3 is an enlarged view taken on line 3—3 of Fig. 2.

Fig. 4 is a view on line 4—4 of Fig. 1.

Fig. 5 is an enlarged view taken on line 5—5 of Fig. 2.

Fig. 6 is a fragmental plan view of the work bed of the machine showing the shear in a retracted position and open position.

Figures 1, 7:
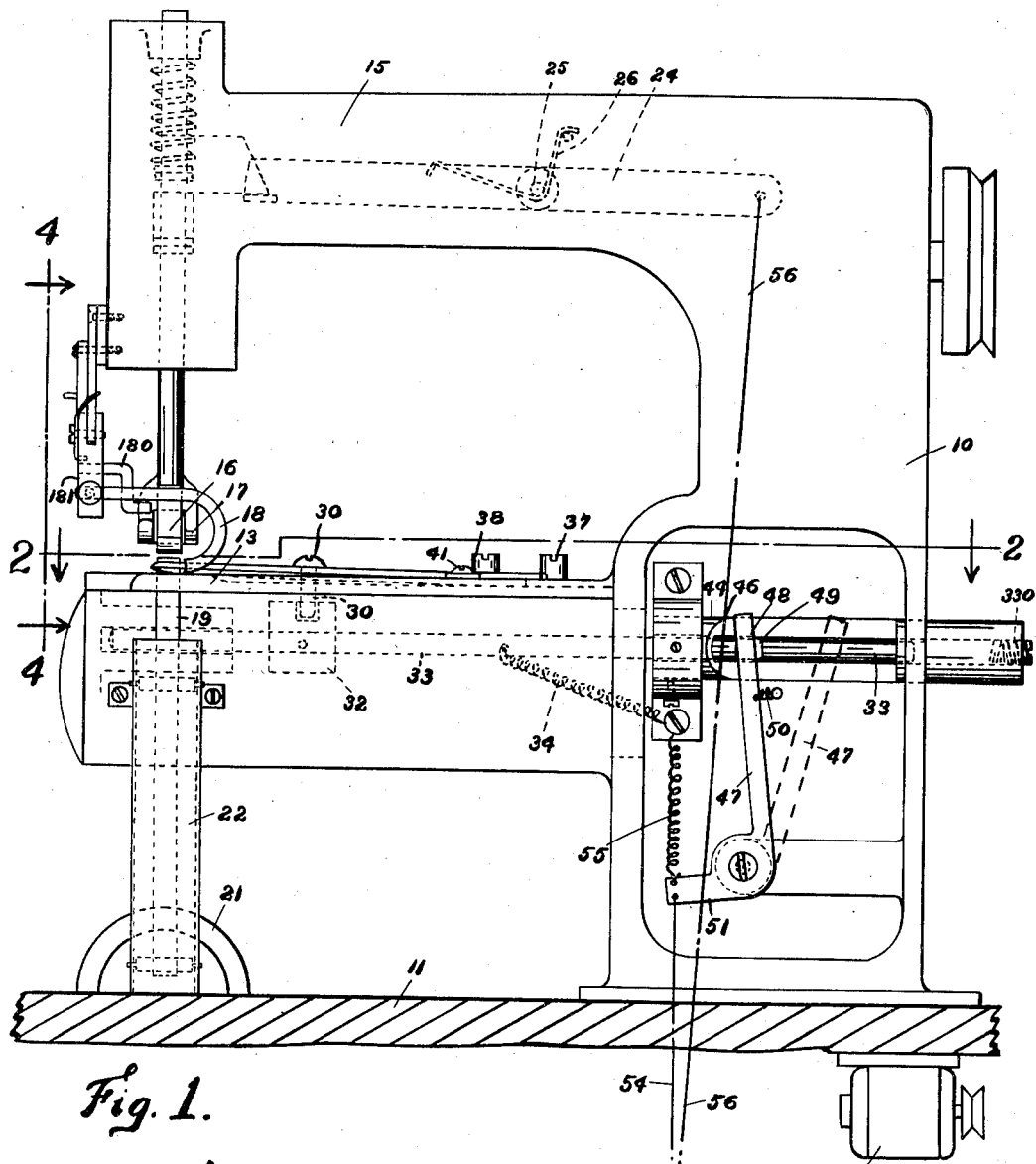
Fig. 1 is a side elevational view of a taping machine embodying the cut-off mechanism of the invention.
Fig. 7 is a fragmental view similar to Fig. 4 and showing the relation of the parts and the work and tape during the shearing operation.

The machine in which the shearing mechanism of the invention is embodied may be one of several which are adapted to lay a tape and work together in suitable relation and to be pressed together and caused to adhere one to the other by reason of an adhesive on the tape. Such a machine would comprise generally a frame 10 mounted upon a table 11 at which the operator sits and driven by a motor 12. The feed table 13 on the frame has a small opening through which a feed plate or dog 14 operates. Depending from an overhanging arm 15 on the frame are rods which carry a walking foot 16 and presser foot 17 all of which cooperate to feed and press together a tape 19 and a piece of work such as a shoe upper 20. A work guide 18 normally remains in the position shown, but is arranged to be lifted by a finger 180 cooperating with lift lever 181 when the presser foot is raised. The means for feeding the tape and for heating the tape to render the heat plastic adhesive tacky are not illustrated herein in detail, but may be constructed in the fashion shown in the patent to Philip L. O'Donnell, U. S. Patent Number 1,628,800, issued May 17, 1927, and in the patent to Philip L. O'Donnell et al, Patent Number 1,724,038, issued August 13, 1929, wherein tape is fed from a supply roll through a heater such as 21 and upwardly through guides 22 and 23, and across the feed plate 14. Presser foot and walking foot may be raised to enable the operator to initially position the work and tape for subsequent progressive and adhesive connection thereof by the machine. These parts may be raised manually and are also adapted to be lifted mechanically by means of a lever 24 pivoted intermediate its ends as at 25, but are normally held in a depressed position by spring 26.

A groove 27 in feed table 13 reciprocally receives one arm 28 of a scissor or shear, the other arm 29 of which is pivotally mounted thereto by a screw 30 which projects through a slot 31 in table 13 and enters a smooth bore in block 32 mounted on a shiftable rod 33. A spring 34 normally holds block 32 in such position that the shear 28—29 is in a retracted position. The arm 29 of the shear has cam faces 35 and 36 which cooperate with a pair of fixed pins or studs 37 and 38 respectively when the shear is bodily reciprocated in table 13 through the agency of the rod and block to effect opening and closing of the shear blades in substantially the same manner as a normal hand scissors is operated. The forward end of groove 27 in table 13 has a tapered cam surface 39 whereby the forward end of the blade or arm 28 of the scissors is raised as it is projected outwardly over the feed plate 14. A fixed washer 40 retained in position by screw 41 in table 13 projects over a portion of the blade or arm 28 of the shear and retains it in the groove. This holding imparts a slight flexing of blade or arm 28 when the shear is projected forwardly as shown in Fig. 2. This result in turning the shear very slightly so that its opposed cutting edges 42 and 43 are in position on opposite sides of an interposed tape to cut in a horizontal plane and thereby sever the tape very close to the work and allow an end of the tape 19 to remain projecting from the tape guide 23 so that there is no need of adjusting the tape upon entry of a new piece of work. When the shear is retired in the manner hereinafter explained it resumes its position in groove 27 in an open position.

Referring to Fig. 2 it will be noted that rod 33 passes through a tubular housing 44 which is cut away as at 45 to expose the rod 33, the housing being arcuately cut away at 46 to provide a cam face. A bell crank lever 47 has one end 48 normally seated in a notch 49 in rod 33 and is yieldably held in position by a spring 50. The arm 51 of the bell crank lever 47 is connected to the moving end 52 of a treadle 53 by a chain or cable 54 so that when the operator presses down upon treadle 52 the long arm of the bell crank 47 will move from the position shown in dotted lines in Fig. 1 to the position shown in full lines therein and if the treadle is further depressed the arm 47 will be moved out of notch 49 by the cam face 46 on housing 44 whereupon the rod 33 will be quickly retracted under the influence of spring 34 and withdraw the shear. A spring 55 opposes movement of the treadle and bell crank lever and, when the treadle is released by the operator spring 55 returns the bell crank to the position shown in dotted lines in Fig. 1 where the long arm seats in the notch 49 in the retracted rod 33. A second chain or cable 56 connects with the treadle and with the end of the arm 24 so that upon depression of the treadle the arm 24 will be tilted about its pivot 25 and the forward end raised to cause the mechanical lifting of the walking foot 16 and presser foot 17 at which time the cable 54 operating on bell crank 47 will begin to project the shear forwardly and out of the groove. As the points of the shear approach the work guide, the further lifting of the forward end of rod 24 further raises the members 16 and 17 and allows the respective points of the shear which is still in the open position to pass above and below the tape 19. During this action stud 38 has been operating on cam face 36 of arm 29 to initiate the closing or snipping movement of the shear. Upon the final depression of the treadle this snipping or closing movement is completed and the bell crank lever, upon movement to the left as shown in Fig. 1 is disengaged from the notch 49 in rod 33 by the cam face 46 on housing 44, whereupon the shear retracts under the influence of spring 34 and during its retracting movement is opened by cam 37 operating on cam face 35 of the arm or blade 29. The retractive movement of the rod 33 is adjustably limited by a set screw 330 in the end of housing 44.

It will be noted that it has thus been unnecessary for the operator to shut off the motive power in order to operate the shear, since initial movement of treadle 52 raises the presser foot and walking foot and in that way stops the feed of the work while the shear blades or scissors automatically enter under the work, take the tape between them and cut it close to the work so that the operator may, without loss of time, place the finished piece of work aside and start a new one by removing the pressure from the treadle and thus lowering the presser foot and walking foot onto the work. The severed end 190 of the tape is long enough to be adjusted to a new piece of work without any delay so that in practice the severed end of the tape does not have opportunity to cool, but remains tacky for a period of time which is ample for an average operator to start a new piece of work through the machine. This arrangement therefore not only saves valuable time, but avoids the necessity for pulling out and snipping off a quantity of tape which sometimes occurs when the operator must pick up a pair of scissors, cut the work, lay down the scissors and then pick up a new piece of work to feed to the machine. Likewise the necessity of manipulating the power control for the machine is obviated when the operator has a large number of pieces to be done.

What is claimed is:

1. In a cut-off mechanism for taping machines the combination with a taping machine comprising a feed table having a feed dog and a presser foot and walking foot cooperative therewith, said feed table being grooved, of a shear arm reciprocable in the groove of the table, a cooperating shear arm pivoted to the first mentioned shear arm, a rod reciprocable beneath the table, means whereby the shear arm structure is moved by said rod, said rod having a notch therein, an arm normally seated in the notch in the rod and movable to effect movement of the rod in one direction, means yieldingly opposing said last mentioned movement, a treadle, means connecting the treadle and arm for moving the rod in one direction against said yielding means, a cam face in the path of the arm for moving the arm out of the notch in the rod, means for lifting the presser foot and walking foot from the table and means connecting the treadle and said lifting means whereby movement of the treadle simultaneously raises the walking foot and presser foot and projects the sheer member therebeneath for severing a tape and for automatically retiring the shear member, the treadle being releasable for permitting return of the walking foot and presser foot to the table.

2. In combination with a grooved feed table, of a pair of pivotally mounted shears, means yieldably retaining the shears in a retracted position in said groove, means cooperating with one of the shear members for opening the shears in said retracted position, means comprising a notched rod and a pivoted arm yieldably seated in said notch in the rod for projecting the shears and subsequently releasing the arm from the notch whereby to place the shears under the yieldable retracting means and means for effecting closing and cutting action of the shears on its forward movement under the influence of said arm.

3. In a cut-off mechanism for taping machines the combination with such taping machine including a walking foot and presser foot, a feed table and means for raising and lowering said feed members relative to said table, a pair of pivoted shear members reciprocable over the feed table into and from the path of said feed members, means to project the shear members forwardly, means cooperating with one of the shear members to close the shears on said forward movement, yieldable means for retracting the shear members, means cooperating with one of the shear members for opening the shears on said retracting movement and means comprising a treadle, and treadle operated means for moving the shear projecting means forwardly and subsequently releasing it to the retracting means and for simultaneously raising the walking foot and presser foot out of the path of the shear.

4. In a device of the class described a frame and feed table, said feed table having a feed dog aperture, a groove and a slot through the table in the bottom of groove, a pair of shears normally disposed in said groove, a pivot for the shears extending through the slot in the groove, a reciprocable rod beneath the table, means on the rod to impart the movement thereof to the shears, a pivoted bell crank lever having an arm engaging the reciprocable rod for projecting the shears, means for releasing the arm from engagement with the rod, a treadle connected with the bell crank lever and means on the feed table cooperating with one of the shear members for effecting closing and opening of said shear members as they are projected toward and away from the feed dog opening.

5. In a taping machine the combination with a frame and feed table, a presser foot and a walking foot movable toward and away from said table, a lever for raising and lowering said members, a treadle, means connecting said lever with the treadle whereby depression of the treadle raises said presser foot and said walking foot, the table having a groove therein, a shear member comprising an arm reciprocable in said groove, means for projecting a shear into the path of the presser foot upon depression of the treadle, cam means operating on the shear for effecting closing movement of the shear on its projecting movement, means yieldably retracting said projecting means and means operable by the treadle for releasing the projecting means and automatically submitting the shear member to the action of the retracting means.

6. In combination a work table, a tape guide for directing the tape over said table, a presser foot and walking foot, a feed dog cooperating with said feet to press the tape which is fed through the guide upon an interposed piece of material, a shear mechanism reciprocable across the path of the tape adjacent the tape guide, means for closing the shears on its projecting movement, means to retract the shears, means for opening the shears on its retracting movement, means actuatable to move the projecting means to its limit of movement and to then release it to the action of the retracting means, means to lift the presser foot and walking foot, and a pedal control member connected to the projector actuating means and to the lifting means for said presser foot and walking foot whereby actuation of said control means successively raises said feet to stop feed of the tape and work and projects the shear beneath the work and severs the tape whereupon the shear is automatically retracted, release of said control means lowering the presser foot and walking foot for co-action with the feed dog upon the tape and interposed work.

7. In combination with a taping machine including a feed dog and cooperating elements including a presser foot, of a work guide, a cut-off mechanism, pedal operated means for lifting the presser foot and actuating shear mechanism for severing a tape and means actuable by the lifting movement of the presser foot for raising the work guide upwardly and out of the path of the shear mechanism.

8. In combination, a working table, a tape guide for directing tape over said table, a presser foot and walking foot, a feed dog cooperating with said feet to press the tape which is fed through the guide upon an interposed piece of material, a shear mechanism reciprocable across the path of the tape adjacent the tape guide, means for closing the shears on its projecting movement, means for retracting the shears, means for opening the shears upon its retracting movement, means actuatable to move the projecting means to its limit movement and then release it to the action of the retracting means, a work guide associated with the presser foot and walking foot and adapted to be independently and conjointly lifted therewith, and a pedal control member connected to the projector actuating means and to the lift means for said presser foot, walking foot and work guide whereby actuation of said control means successively raises the feet to stop the feed of the tape and work and also raises the work guide, and then projects the shear beneath the work and severs the tape, whereupon the shear is automatically retracted, release of the pedal control means lowering the presser foot and walking foot under the control of an operator for co-action with the feed dog upon the tape and the interposed work.

PHILIP L. O'DONNELL.
EDWARD GROH.